Dec. 28, 1943.  H. G. HUGHEY ET AL  2,337,659
COMPOSITE VALVE UNIT AND VALVE OPERATING MEANS
Filed June 13, 1941  2 Sheets-Sheet 1
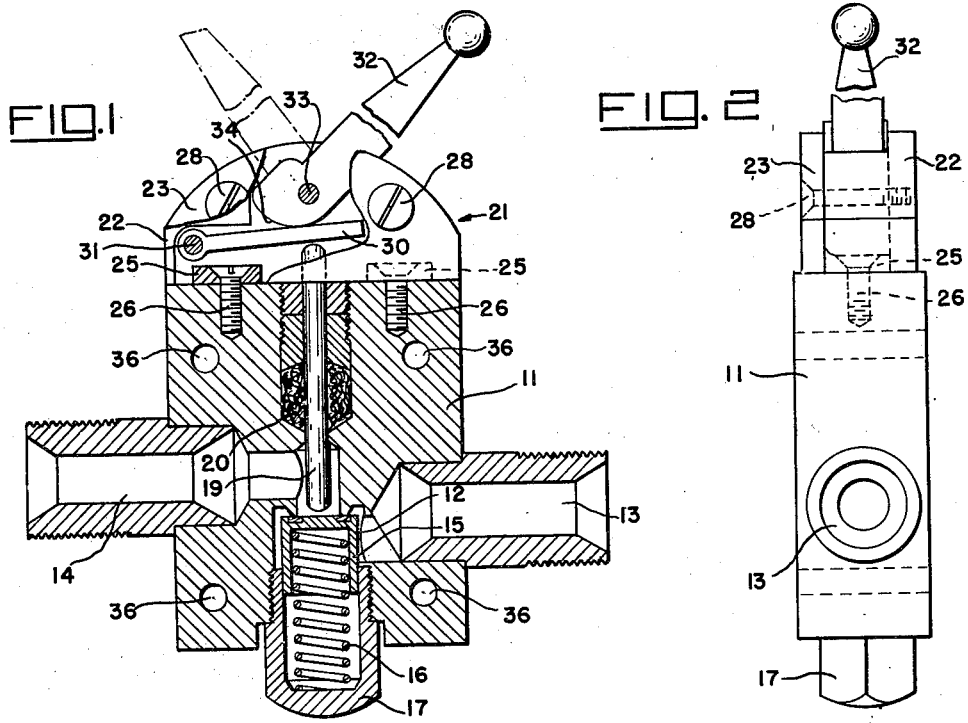
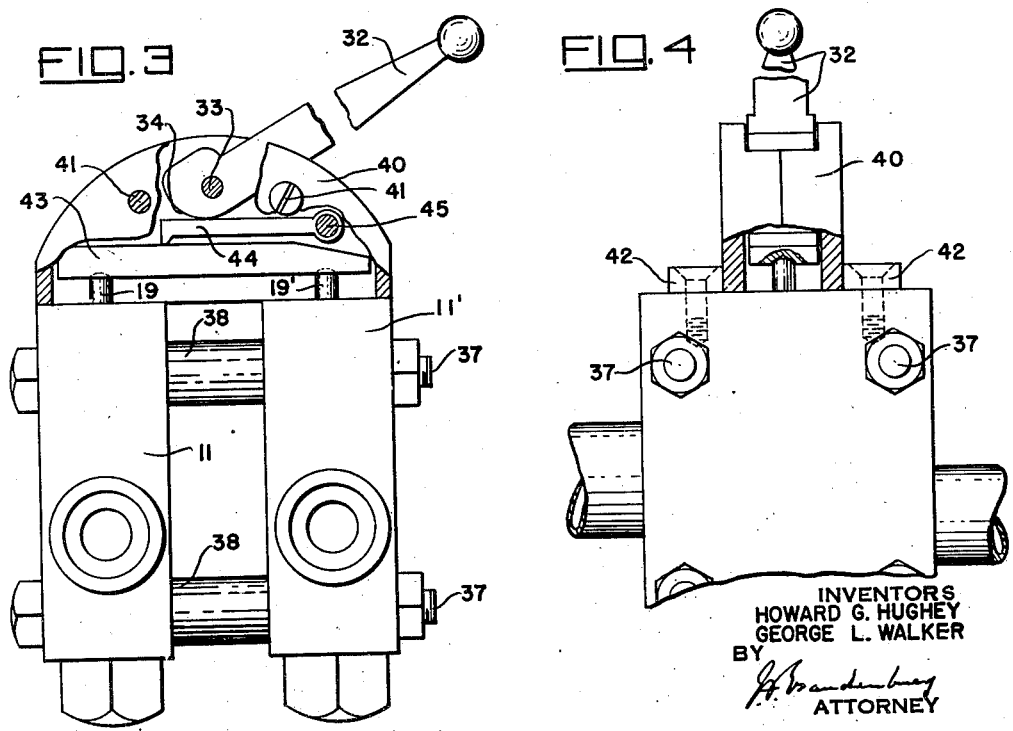
INVENTORS
HOWARD G. HUGHEY
GEORGE L. WALKER
BY
ATTORNEY

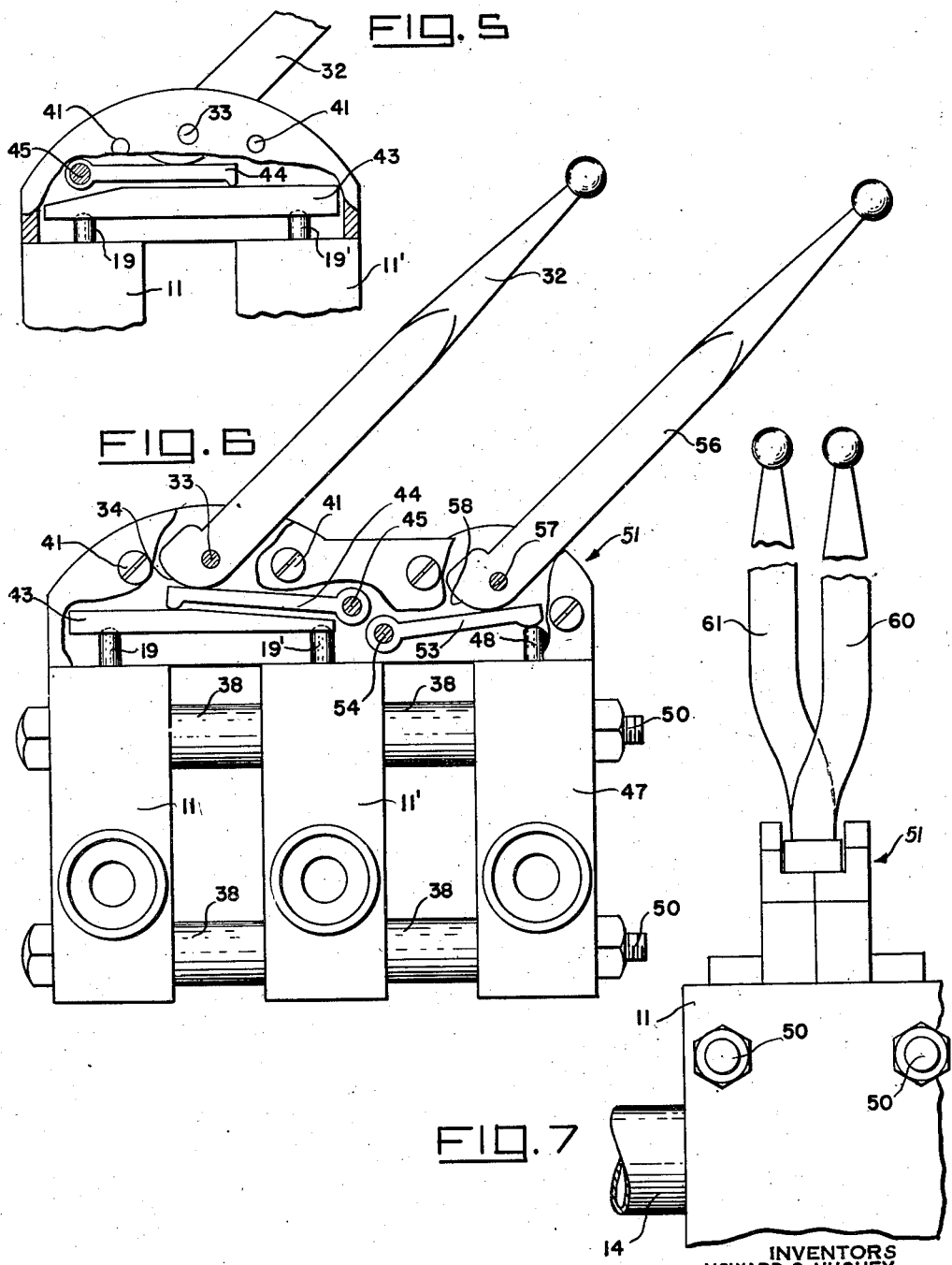

Patented Dec. 28, 1943

2,337,659

UNITED STATES PATENT OFFICE 2,337,659

COMPOSITE VALVE UNIT AND VALVE OPERATING MEANS

Howard G. Hughey, Fanwood, and George L. Walker, Jersey City, N. J., assignors to Air Reduction Company, Incorporated, New York, N. Y., a corporation of New York Application June 13, 1941, Serial No. 397,848

14 Claims. (Cl. 277—20)

This invention relates to valves for controlling a supply of fluid to a torch or other device, and certain features of the invention relate to valves for controlling the supply of two or more fluids, such as fuel gas, oxygen, and water or other quenching fluid, and to controlling the operation of the valves in a given sequence.

One object of the invention is to make composite valve units from individual parts that are of similar construction and that are combined in different numbers and in various ways depending upon the number of gases or fluids to be controlled. The similar parts that are so combined each comprises a valve casing containing a valve element and having a valve rod that extends through one wall of the casing.

The valve casings are of such construction that two or more of them can be disposed side by side, with any necessary spacers between them, and then connected together into a composite unit. The outstanding advantage is standardization of valve structure and the resulting economy that is effected by not having to build or stock so many different kinds of valves as formerly. With this invention the valve unit for a three-hose cutting torch, or for a flame hardening torch with quenching jets, is made up of the same valve casings, with one additional, as the valve unit for a welding torch.

Another object of the invention is to provide improved valve-operating mechanism, and a more specific object is to provide a valve-operating unit that can be assembled from individual valve casings that are connected together to make up a composite valve unit.

Other features of the invention are concerned with the sequence of operation of the control valves. In some embodiments of the invention two valves are operated by a floating bar that is actuated from a region nearer to one valve rod than to the other to effect successive operation of the valves; the operating means is made reversible to change the sequence in which the valves open; and a desired sequence of operation is obtained by an interference between levers that move in the same plane.

Other objects, features and advantages of the invention will appear or be pointed out as the specification proceeds.

In the accompanying drawings, forming a part hereof:

Fig. 1 is a side view, mostly in section, showing a single valve casing and its operating mechanism;

Fig. 2 is an end view of the structure shown in Fig. 1;

Fig. 3 is an end view, partly broken away, showing two valve casings connected together and operated by a floating bar operating device embodying this invention;

Fig. 4 is a side view, partly in section, showing the structure of Fig. 3;

Fig. 5 is a detail view showing the valve-operating device of Fig. 3 arranged to operate the valves in a different sequence than in Fig. 3;

Fig. 6 is an end view, partly broken away, showing three valve casings connected together and equipped with operating means embodying the invention; and Fig. 7 is a side view of a two-lever operating mechanism, such as shown in Fig. 6, but with the levers offset to avoid interference.

Fig. 1 shows a valve unit comprising a block or casing 11 in which is a chamber containing a valve seat 12. Gas enters the valve chamber through an inlet conduit 13 and flows from the chamber through an outlet conduit 14. A valve element 15 is urged against the seat 12 by a spring 16 that is compressed between the valve element and a cap 17 that threads into the valve block 11 and closes the valve chamber.

When the valve element is against the seat 12 it is in closed position, and there is an insert of hard rubber, or other suitable material, in the face of the valve element in position to contact with the seat 12 to prevent leaking of gas past the valve element without requiring undue pressure of the valve element against the valve seat.

A valve rod 19 extends through the top wall of the valve block 11 and there is a stuffing-box 20 recessed in the top of the block or casing and surrounding the valve rod 19. In the illustrated embodiment of the invention the valve rod 19 is a plunger separate from the valve element 15, but a valve element in which the rod is an integral stem connected to the valve element can be used.

A housing or frame 21 is attached to the top of the valve block 11. The housing 21 includes right- and left-hand portions 22 and 23, respectively. The right-hand portion 22 (Fig. 2) has lugs 25 by which the housing 21 is connected to the top of the valve block. Screws 26 pass through the lugs 25 and screw into holes in the top face of the valve block 11. The left-hand portion 23 of housing 21 is attached to the right-hand portion by screws 28.

A pedal 30 (Fig. 1) is fulcrumed at one end on a pin 31 that extends between the opposite side walls of the housing 21 and rests on the upper end of the valve rod 19. An operating lever 32 is supported near its lower end by a shaft 33 extending across the housing 21, and the lever 32 projects out through a slot in the top of the housing. The foot of the lever 32 is formed into a cam 34 that depresses the pedal 30 and displaces the rod 19 to shift the valve element 15 away from the seat 12 into open position when the lever 32 is moved from the full to the dotted-line position shown in Fig. 1.

The valve block or casing 11 has a width substantially less than its length and height, as is apparent from a comparison of Figs. 1 and 2. There are parallel openings 36 extending through the block 11 in the direction of the width of the block. These openings are not used when an individual valve casing is provided with its own operating devices as in Figs. 1 and 2. When making up composite valve units for controlling the supply of more than one gas, individual valve blocks are disposed with their corresponding openings 36 in line and the individual blocks are connected together by bolts 37 (Fig. 3) extending through the openings 36. Spacer sleeves 38 surrounding the bolts 37 hold the individual blocks at the desired distance from one another. The bolts 37 clamp the individual valve blocks firmly against the ends of the spacers 38 and connect the individual valve blocks in a unitary structure.

The left-hand valve block in Fig. 3 is designated by the reference character 11 and the right-hand valve block, which is of similar construction, by the reference character 11'. Various parts associated with the block or casing 11' are designated by the same reference characters as the corresponding parts associated with valve casing 11 but with a prime affixed. The valve element in casing 11 controls the supply of fuel gas, such as acetylene, and the valve element in casing 11' controls the supply of oxygen.

A frame or housing 40 is made up of right- and left-hand halves connected by screws 41 and each half of the housing has lugs 42 (Fig. 4) for connecting the housing 40 with the valve casings 11 and 11'. Screws 26 connect the lugs 42 to the top of the valve casings, and these screws thread into the same holes in the valve casings as when connecting the housing 21 (Fig. 1) of the single valve-operating apparatus, but the housing 40 in Figs. 3 and 4 extends in the direction of the width of the valve casings instead of in the direction of the length of the casing as in Fig. 1.

The valve-operating apparatus of Figs. 3 and 4, for operating two valves, includes a floating bar 43 that has recesses in its bottom face for receiving the ends of the valve rods 19 and 19'. These recesses are shallow and the valve rods fit freely enough so as not to interfere with the changes in the angular relation of the bar 43 with respect to the valve rods 19, 19'. The floating bar 43 is supported solely by the valve rods 19 and 19' in the illustrated embodiment of the invention, and while the bar 43 has clearance from the sides and ends of the housing 41 the housing prevents any substantial displacement of the floating bar 43 either sideways or endwise.

A pedal 44 is supported at one end by a pin 45 and rests at its other end on the floating bar 43 at a region closer to the valve rod 19 than to the valve rod 19'. This off-center loading of the floating bar 43 causes the left-hand end of the floating bar to be depressed first when the pedal 44 is pushed down. In this first movement of the floating bar 43 the upper end of the valve rod 19' serves as a fulcrum for the floating bar.

As the left end of the floating bar 43 moves down it displaces the valve rod 19 and causes the valve element in the casing 11 to move into open position. When the left end of the floating bar 43 strikes the top face of the valve casing 11 that end of the floating bar becomes a fulcrum and as the pedal 44 is pushed down further it depresses the right end of the floating bar 43 and displaces the valve rod 19' to move the valve element in casing 11' into open position.

An operating lever 32 is supported for angular movement on a shaft 33 that is connected to the frame or housing 40. The cam face 34 moves the pedal 44 when the lever 32 is moved angularly about the shaft 33 in exactly the same way as the lever 32 moves the pedal 30 of Fig. 1.

The cam face 34 is so shaped that the operating lever can be turned around without affecting the operation of the apparatus in any way other than to make the position of the lever 32, that corresponds with the open position of the valve elements, at the left end of the stroke instead of at the right as in Fig. 3.

The frame 40 can also be reversed so as to operate the right-hand valve ahead of the left. By reversing the frame or housing 40 on the valve casings 11, 11' and at the same time reversing the lever 32 with respect to the housing 40, the apparatus can be made to move the valve element in casing 11' into open position ahead of the valve element in casing 11, but the operating lever 32, because of the two reversals, still slopes to the right when the valve elements in both casings are in closed positions.

Fig. 5 shows such a condition.

Valve structure for controlling the supply of gases to a three-hose cutting tip, or for supplying oxygen, fuel gas, and quenching fluid for flame hardening, is shown in Fig. 6. The valves in casings 11 and 11' control fuel gas and oxygen supply, respectively. A third valve casing 47, which may be for cutting oxygen or for quenching fluid, is connected with the casings 11 and 11' to make up the valve unit. This third valve casing 47 is similar to the valve casings 11 and 11' and has a valve rod 48 corresponding to the valve rods 19, 19'.

For a three-valve unit longer bolts 50 are required, and spacers 38 between the valve casings 11' and 47 are the same as those between the valve casings 11 and 11'. A frame or housing 51 extends across all three of the valve casings 11, 11' and 47. The left-hand portion of this frame 51 is similar to the frame 40 of Fig. 3 and it contains similar valve-operating members designated by the same reference characters as in Fig. 3.

A second pedal 53 is supported at one end by a pivot pin 54 that rests at its other end on the end of the valve rod 48. This valve rod is pushed down to depress the valve rod 48 by an operating lever 56 that is supported by a shaft 57 and has a cam face 58 in contact with the pedal 53. The lever 56 and its cam face are in all respects similar to the other operating lever 32.

By making the levers 32 and 56 with straight handle portions, an interference is obtained that prevents operation of the control lever 56 to supply cutting oxygen before the valve elements in casings 11 and 11' have been moved into open position to supply gas for the preheating flames. With the lever 32 in the position shown in Fig. 6, the other operating lever 56 cannot be moved to the left far enough to shift the valve element in casing 47 into open position without striking the other operating lever 32.

Fig. 7 shows a construction in which two operating levers 60 and 61 are offset in opposite directions so that they can be supported for angular movement about adjacent and parallel shafts, as in Fig. 6, but without the interference feature of the apparatus shown in Fig. 6.

Several embodiments of the invention have been illustrated and described, but changes and modifications can be made and some features of the invention can be used without others without departing from the invention as defined in the claims.

We claim:

1. A composite valve unit comprising two individual valve casings, fastenings connecting the valve casings together to form a structural unit, a valve rod extending through the top wall of each casing, a housing unit extending across the top of said casings and connected thereto, a floating bar in the housing resting on the ends of the valve rods, a pedal supported at one end from the housing and with its other end resting on the floating bar nearer one of the valve rods than the other, an operating lever pivotally supported by the housing, and an end portion on the lever for depressing the pedal when the operating lever is oscillated about its pivotal connection with the housing.

2. The combination of two individual valve casings, each of which contains a valve element and has a valve rod extending through a wall of the casing and movable to cause the valve element to be shifted between open and closed positions, a valve-operating structure comprising a housing with a floating bar therein and an operator-actuated element including cam means for displacing the floating bar, fastening means connecting the valve casings together, and fastenings connecting said housing to the valve casings in a position with the floating bar across the ends of both valve rods.

3. A valve unit made up of a plurality of individual valve casings each containing a valve element and having a valve rod extending through the top wall of the casing for shifting the valve element between open and closed positions, fastening means connecting the valve casings together into a structural unit, and valve-operating apparatus including a frame that is a different part from the valve casings and that extends across the top of all of the valve casings, and means in the frame for operating the valve rods, said valve-rod-operating means including at least one member, the operation of which causes operation of more than one of said valve rods, and fastenings connecting said frame with the valve blocks to form a unitary structure with the valve blocks.

4. A composite valve unit including a plurality of individual valve casings of similar construction and each containing a valve element and each having a valve rod extending through the top wall of the casing, a frame that is a different part from the valve casings, fastening means connecting the casings and said frame together into a structural unit with the frame extending across the top of all of the valve casings, and operating means in the frame for displacing the valve rods to cause the valve elements in said valve casings to move between open and closed positions, said valve rod displacing means including at least one member, the operation of which causes the displacement of more than one of said valve rods.

5. Apparatus for controlling the supply of gas to an oxy-fuel gas burner or torch, said apparatus including a valve block containing a valve element for controlling the supply of oxygen and having a valve rod extending through the top wall of the block, said valve block being substantially longer than it is wide and having parallel bolt openings extending therethrough in the direction of the width of the block, a similar valve block containing a valve element for controlling the supply of fuel gas, both of the valve blocks being disposed with their corresponding bolt openings in line with one another, spacing means between the valve blocks, bolts extending through said openings and clamping the blocks against the spacing means to form a composite valve unit, a housing extending transversely across the top faces of both of said valve blocks, fastening means connecting the housing to the valve blocks to form a part of said composite valve unit, a floating bar in the housing, resting on the valve rods of the respective valve blocks and having shallow recesses into which the valve rods extend, a pedal pivoted at one end to the housing and contacting with the floating bar toward the end of the bar that is over the fuel gas control valve, and an operating lever pivotally connected to the housing and having a cam face at its lower end for contact with said pedal.

6. A composite valve unit comprising similar valve means, one for controlling a supply of fuel gas, and another for controlling a supply of oxygen, each of said valve means comprising a casing containing a valve element and having a valve rod extending through the top wall of the casing, fastening means connecting the valve casings together, a unitary frame that extends across the top of both valve casings, fastenings connecting said frame with the valve casings and constructed and arranged for connecting the frame with the valve means in either of two positions that are the reverse of one another, an operating bar in said frame in contact with the valve rods of the different valve casings, and an actuator that contacts with the bar nearer to one valve rod than the other so that the bar displaces one valve rod ahead of the other.

7. A composite valve unit comprising similar valve means, one for controlling a supply of fuel gas, and another for controlling a supply of oxygen, each of said valve means comprising a casing containing a valve element and having a valve rod extending through the top wall of the casing, fastening means connecting the valve casings together, valve-operating means including a frame that extends across the top of both valve casings, a bar that contacts with both valve rods at the same time, and a bar actuator that causes the bar to depress the valve rods and to displace one valve rod ahead of the other, at least a part of said valve-operating means being reversible with respect to the valve casings to change the sequence of operation of the valves.

8. A valve-operating unit including a frame with means for connecting it to a valve casing, a bar in the frame for contacting with the valve rods that are to be actuated by said operating unit, a pedal pivotally connected with the frame and having a portion remote from its pivot in contact with said bar, a shaft supported by the frame, and an operating lever that turns on the shaft as a fulcrum and that has a foot portion which displaces the pedal as said lever moves about its fulcrum.

9. Apparatus for displacing a plurality of valve rods to operate the respective valves associated with said rods, said apparatus comprising a bar with recesses into which the valve rods extend, a frame for connection with a valve unit that supports the valve rods, a pedal that contacts with the bar, a pivot pin supporting said pedal from the housing, and a handle for moving the pedal about its pivot to move the bar and displace the valve rods.

10. Apparatus for operating two valves in sequence including in combination a frame for connection with one or more valve casings in which the valves are contained, a bar for extending across the ends of valve rods that project from the one or more casings and for contacting with both of said valve rods, and members for moving the bar to displace the valve rods, said members including a pedal fulcrumed on the frame and contacting with the bar nearer to one end than the other to cause that end of the bar to move ahead of the other end and thus obtain successive displacement of the valve rods.

11. Valve-operating apparatus for operating two valves that have valve rods extending in parallel directions from the top of a valve unit, said apparatus including in combination a frame for connection with the valve unit, a floating bar in said frame with recesses in the lower face of said bar for receiving the ends of the valve rods, a pedal pivotally connected with the frame and contacting with the top of the floating bar nearer to one of said recesses than the other so that pressure of the pedal against the floating bar depresses one end of the bar ahead of the other, a shaft extending from the frame, an operating lever angularly movable about the shaft as a pivot, and a cam at the foot of the lever for operating the pedal when the lever is moved angularly.

12. Valve-operating apparatus including a frame, a first operating lever pivotally supported by the frame, a member operated by angular movement of said lever about its pivotal axis for transmitting motion to a valve element, a second operating lever pivotally supported by the frame for angular movement about an axis substantially parallel with the pivotal axis of the first operating lever, and means for transmitting motion of the second operating lever to a valve, at least a part of the movement of both operating levers being through the same space so that one of said levers has to be operated ahead of the other to prevent it from interfering with the movement of the other into valve-operating position.

13. In valve-operating apparatus having separate pedals for actuating different valves, a separate lever for displacing each of said pedals, and pivot supports positioned beside one another with their axes substantially parallel and each supporting one of the levers that displaces pedals, said levers having handle portions which are offset so that the levers can swing about their adjacent and parallel pivot axes without interfering with one another.

14. Valve-operating apparatus for operating three valves that have valve rods extending in parallel directions from the top of a valve unit, said apparatus including in combination a frame for connection with the valve unit, a floating bar in said frame with recesses in the lower face of said bar for receiving the ends of two of the valve rods, a pedal pivotally connected with the frame and contacting with the top of the floating bar nearer to one of said recesses than the other so that pressure of the pedal against the floating bar depresses one end of the bar ahead of the other, a shaft extending from the frame, an operating lever angularly movable about the shaft as a pivot, a cam at the foot of the lever for operating the pedal when the lever is moved angularly, a second pedal pivotally connected with the frame and movable on its pivot in a direction to displace the third valve rod, a second operating lever supported by the frame and angularly movable about an axis parallel to the axis of the shaft, and a cam at the foot of the second operating lever for operating the second pedal, both of said operating levers being movable in the same space during a portion of their stroke, and so related that the first operating lever must be moved into position to cause depression of the floating bar in order to remove the first-named operating lever from the path of the second-named operating lever and permit the second operating lever to be operated to displace said third valve rod.

HOWARD G. HUGHEY.
GEORGE L. WALKER.